United States Patent
Goossens (10) Patent No.: US 7,209,424 B2
(45) Date of Patent: Apr. 24, 2007

(54) CONTROLLER DEVICE WITH SWITCHABLE CHARACTERISTIC

(75) Inventor: Hendrik Josephus Goossens, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 305 days.

(21) Appl. No.: 10/517,539

(22) PCT Filed: May 27, 2003

(86) PCT No.: PCT/IB03/02343

§ 371 (c)(1),
(2), (4) Date: Dec. 10, 2004

(87) PCT Pub. No.: WO03/107335

PCT Pub. Date: Dec. 24, 2003

(65) Prior Publication Data

US 2005/0254401 A1 Nov. 17, 2005

(30) Foreign Application Priority Data

Jun. 14, 2002 (EP) .................. 02077384

(51) Int. Cl.
*G11B 5/09* (2006.01)

(52) U.S. Cl. ............... 369/59.14; 369/59.1; 369/47.46; 369/47.55

(58) Field of Classification Search ............... None
See application file for complete search history.

(56) References Cited

U.S. PATENT DOCUMENTS

| | | | | |
|---|---|---|---|---|
| 4,785,439 A | * | 11/1988 | Okada et al. | 369/30.27 |
| 5,680,272 A | * | 10/1997 | Kadlec et al. | 360/78.04 |
| 6,397,369 B1 | * | 5/2002 | Despain et al. | 714/798 |
| 2002/0159342 A1 | * | 10/2002 | Ogasawara et al. | 369/44.23 |

* cited by examiner

*Primary Examiner*—Muhammad Edun
(74) *Attorney, Agent, or Firm*—Michael E. Belk (57) ABSTRACT

A controller (30) is capable of operating in two possible operative modes, each mode having a corresponding characteristic (11; 12). Said characteristics have an overlap in a range of error signal values [TLL–TN]. The controller is capable of switching from one mode to another, based on the value of the time-derivative (( ) of the input error signal (e), so that, for a certain input error signal within said range [TLL–TN], the controller can be in any of its modes.

27 Claims, 6 Drawing Sheets

CONTROLLER DEVICE WITH SWITCHABLE CHARACTERISTIC

The present invention relates in general to a controller for an optical disc drive, for controlling certain parameters of an optical head of an optical disc drive.

As is commonly known, an optical storage disc comprises at least one track, either in the form of a continuous spiral or in the form of multiple concentric circles, of storage space where data may be stored. Optical discs may be read-only type, where data is recorded during manufacture, which data can only be read by a user. The optical storage disc may also be a writable type, where data may be stored by a user. For writing data in the storage space of the optical storage disc, or for reading data from the disc, an optical disc drive comprises, on the one hand, means for receiving and rotating an optical disc, and on the other hand an optical head for scanning the storage track with an optical beam, typically a laser beam. For instance, in reading data from a disc, a laser beam is generated and focussed on the track of the rotating disc. Reflected light is captured, and a data signal is retrieved from the reflected light beam. Since the technology of optical discs in general, the way in which data can be stored in an optical disc, and the way in which optical data can be read from an optical disc, is commonly known, it is not necessary here to describe this technology in more detail.

For being able to fulfil its task, the optical head of an optical disc drive comprises movable parts. For instance, the optical head comprises a lens system with an objective lens which is displaceable in the Z-direction, i.e. the longitudinal direction of the light beam, in order to focus the light beam exactly on the track of the optical disc. Further, the objective head is displaceable in the radial direction of the optical disc, in order to be able to follow the track of the optical disc. Even if the optical disc comprises multiple circular tracks, such track may in practice deviate from an exact circular shape, so that the optical head needs to be displaced in order to keep the focus spot of the laser beam exactly on track.

In the following, the present invention will be more specifically explained in relation to the focus control of the objective lens; however, it should be clear to a person skilled in the art that the same explanation, mutatis mutandis, is also valid for track control of the optical head.

For focus control, the objective lens is arranged displaceable in the Z-direction, and the disc drive comprises a controllable actuator operatively associated with the objective lens for displacing the objective lens along the Z-direction. The optical disc drive is further provided with means for generating a focus error signal which is representative for the magnitude of a focus error. As is well-known to persons skilled in the art, such focus error signal can be derived from the optical read signal, so it is not necessary here to explain in great detail how a focus error signal is generated.

The controllable actuator is controlled by a controller which receives the focus error signal as an input signal, and which generates a drive signal for the actuator, the actuator being responsive to this drive signal by displacing the objective lens. The whole setup is such that the focal error is reduced by the displacement of the objective lens. In other words, the controller is designed to generate an output drive signal such that its input error signal is reduced.

In the following, discussion will focus on the behavior of the controller. In principle, any well-known type of device for generating an error signal may be used to generate the input signal for the controller and any type of well-known actuator may be used for obeying the commands of the drive signal outputted by the controller. The present invention relates specifically to the design of the controller, and to a method for generating an actuator drive signal in response to receiving an input error signal.

Figure 1A:
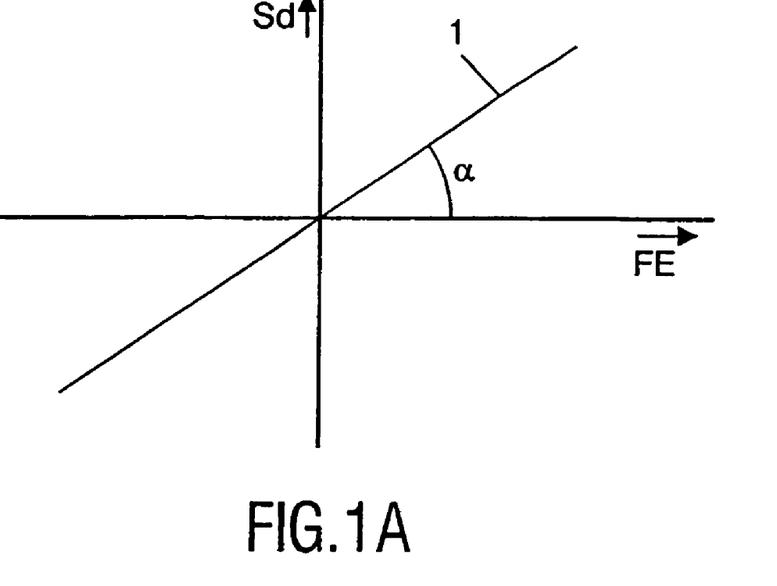
FIGS. 1A–B are graphs schematically illustrating characteristics of prior art controllers.
Figure 1B:
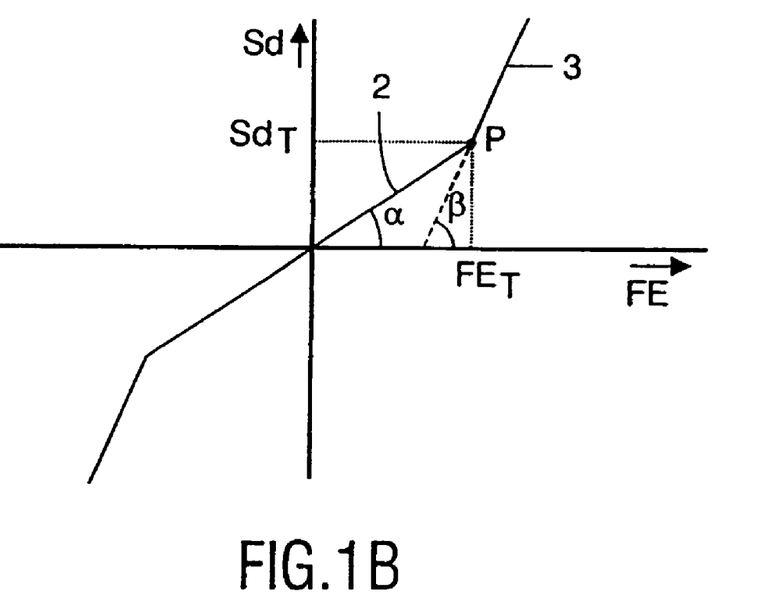

FIGS. 1A–B are graphs schematically illustrating possible characteristics of prior art controllers. The horizontal axis represents the magnitude of the input error signal FE. The vertical axis represents the output drive signal Sd. FIG. 1A illustrates a linear characteristic: the drive signal Sd is directly proportional to the input error signal FE. A controller of this type is also indicated as "proportional controller". In this case, the control characteristic of the controller is represented by a straight line 1, which makes an angle $\alpha$ with the horizontal axis, which angle indicates the gain of the controller. More particularly, if the gain G is defined by the following formula:

$$G = Sd/FE,$$

then the gain of the proportional controller equals $\tan(\alpha)$.

Briefly stated, a higher gain will result in a faster response of the controller, so the overall magnitude of the error signal FE will be smaller. In other words, the higher the gain, the smaller the error. However, it is not advisable to choose the gain G too high, because this may lead to instability of the control system.

FIG. 1B illustrates a known non-linear controller. In this case, the control characteristic of the controller is described by two straight lines, a first line 2 crossing zero and making an angle $\alpha$ with the horizontal axis, this line extending between zero and a certain point P, corresponding with a certain threshold drive signal $Sd_T$ and a certain threshold error signal $FE_T$. Under normal circumstances, the error signal FE will be smaller than this threshold error signal $FE_T$, and the controller will behave according to this first straight line 2. However, under abnormal circumstances, for instance if the optical disc drive is subjected to a mechanical shock, the error signal may pass beyond said threshold level $FE_T$, in which case it is desirable to increase the corrective action of the controller by increasing the gain. To this end, the characteristic comprises a second straight line 3, starting from said point P, and making an angle $\beta$ with the horizontal axis larger than said angle $\alpha$.

In theory, the non-linear characteristic of FIG. 1B is an improvement over the linear characteristic of FIG. 1A; in practice, however, such characteristic is not ideal because it appears to be very difficult to find a setting which is suitable in different situations. It is possible to tune the non-linear controller to function well for one situation, but in another situation, where the noise content of the error signal is larger, the settings of the controller are not usable. A change in noise contribution can be caused by a change of disc. Of course, an optical disc drive should be able to handle a variety of optical discs in a reliable manner.

Therefore, an objective of the present invention is to provide an improved controller with improved controller characteristic, capable of reducing errors for multiple optical discs without the necessity of adapting controller settings for each new optical disc.

In the prior art non-linear controller with the non-linear characteristic illustrated in FIG. 1B, the controller switches its gain between a low value (line 2) and a high value (line 3), the decision as to which gain to use depending on one parameter only, this parameter being the error signal FE. If the input error signal FE is lower than said threshold level $FE_T$, the controller will select its lowest gain (line 2), whereas if the input error signal FE is above said threshold level $FE_T$, the controller will select its highest gain. In contrast, according to an important aspect of the present invention, the controller bases its decision regarding which gain to use on at least two input parameters.

These and other aspects, features and advantages of the present invention will be further explained by the following description with reference to the drawings, in which same reference numerals indicate same or similar parts, and in which.

Figure 2A:
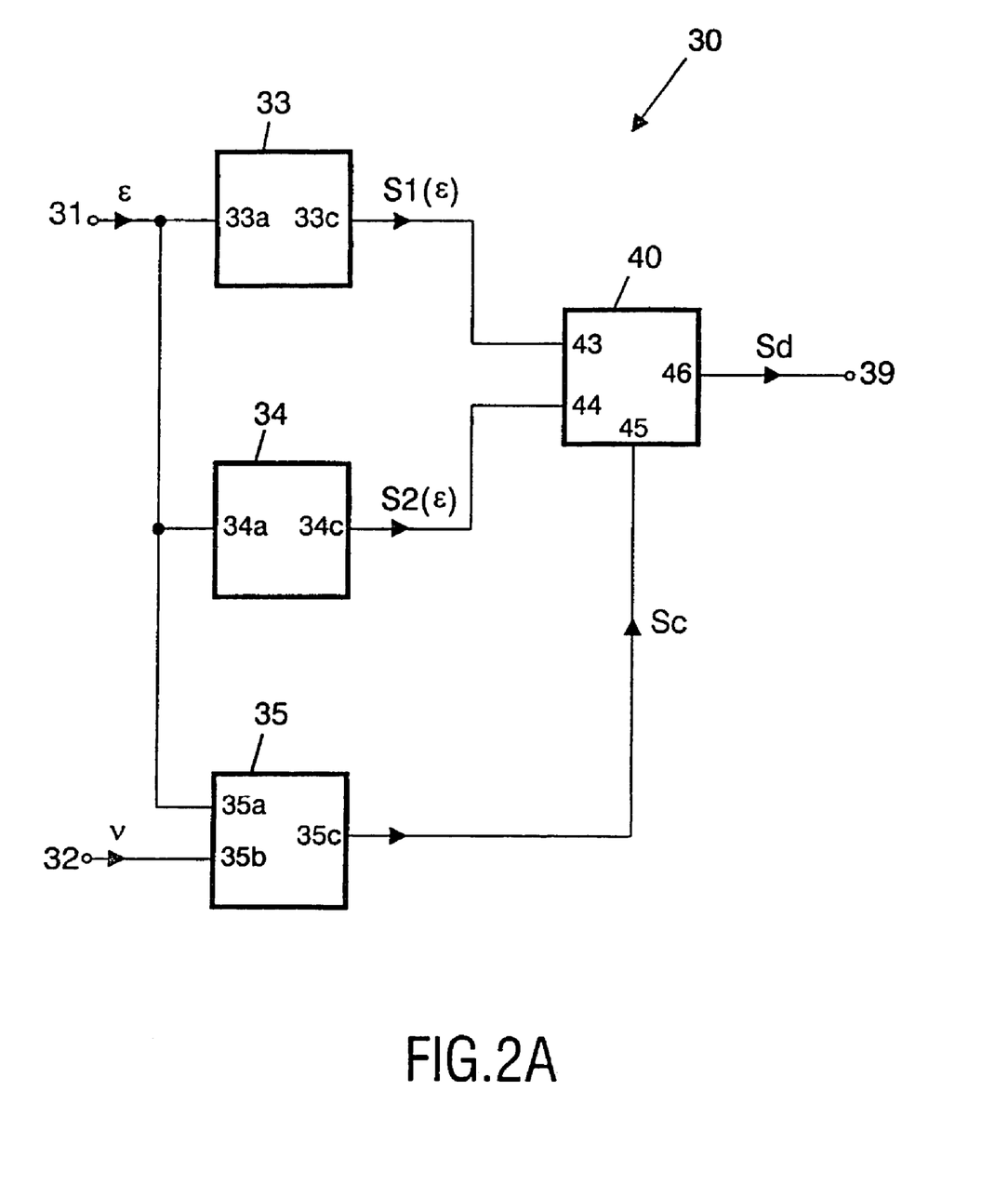
FIG. 2A is a functional block diagram schematically illustrating an embodiment of a controller according to the present invention.

FIG. 2A is a functional block diagram schematically illustrating a controller device 30, comprising a first controller unit 33, a second controller unit 34, a processor unit 35, and a controllable switch unit 40. The controller device 30 has a first input 31 for receiving an input error signal $\epsilon$, and an output 39 for providing a controller output signal Sd.

The first controller unit 33 has an input 33a coupled to said first controller input 31, and has an output 33c providing an output signal S1 ($\epsilon$). The first controller unit 33 may be implemented as a conventional controller. The first controller unit 33 may be a proportional controller having a characteristic such as illustrated in FIG. 1A. The first controller unit 33 may also be a PI controller, in which case the output signal S1($\epsilon$) is generated on the basis of the input error signal $\epsilon$, and signals obtained by integrating the input error signal $\epsilon$ one or more times, and/or signals obtained by integrating previous output signals (feedback) one or more times, as will be clear to a person skilled in the art. The first controller unit 33 may also be a PD controller, in which case the output signal S1 ($\epsilon$) is generated on the basis of the input error signal $\epsilon$ and signals obtained by differentiating the input error signal $\epsilon$ and/or previous output signals one or more times, as will be clear to a person skilled in the art. The first controller unit 33 may also be a PID controller, in which case the output signal S1($\epsilon$) is generated on the basis of the input error signal $\epsilon$, signals obtained by differentiating the input error signal $\epsilon$ and/or previous output signals one or more times, and signals obtained by differentiating the input error signal $\epsilon$ and/or previous output signals one or more times, as will be clear to a person skilled in the art. Since PI controllers, PD controllers, and PID controllers are known per se, it is not necessary here to discuss their design and operation in great detail.

Similarly, the second controller unit 34 has an input 34a coupled to said first controller input 31, and has an output 34c providing an output signal S2($\epsilon$). As mentioned above with reference to the first controller unit 33, the second controller unit 34 may be implemented by a conventional P-controller, PI-controller, PD-controller, PID-controller.

The controllable switch unit 40 has a first input 43 coupled to the output 33c of the first controller unit 33, a second input 44 coupled to the output 34c of the second controller unit 34, and an output 46 coupled to the controller output 39. The controllable switch unit 40 has at least two operative states. In a first operative state, its output 46 is coupled to its first input 43, such that the controller output signal Sd at the controller output 39 corresponds to the output signal S1($\epsilon$) of the first controller unit 33. The controller 30 as a whole now has a controller characteristic corresponding to the characteristic of the first controller unit 33. This situation will be referred to as "the controller device 30 operates in a first operative mode".

In a second operative state, the output 46 of the controllable switch unit 40 is coupled to its second input 44, such that the controller output signal Sd at the controller output 39 corresponds to the output signal S2($\epsilon$) of the second controller unit 34. The controller 30 as a whole now has a controller characteristic corresponding to the characteristic of the second controller unit 34. This situation will be referred to as "the controller device 30 operates in a second operative mode".

For selecting its first or second operative state, the controllable switch unit 40 is responsive to a signal Sc received at a control input 45, which input is coupled to an output 35c of the processor unit 35. The processor unit 35 has an input 35a coupled to said first controller input 31 for receiving the input error signal $\epsilon$. The processor unit 35 generates its output signal Sc on the basis of the input error signal $\epsilon$ and on the basis of at least one further parameter v, which indicates the changing rate of the error signal $\epsilon$, as will be discussed below with reference to FIG. 2B, which is a functional block diagram of an embodiment of the processor unit 35.

Figure 2B:
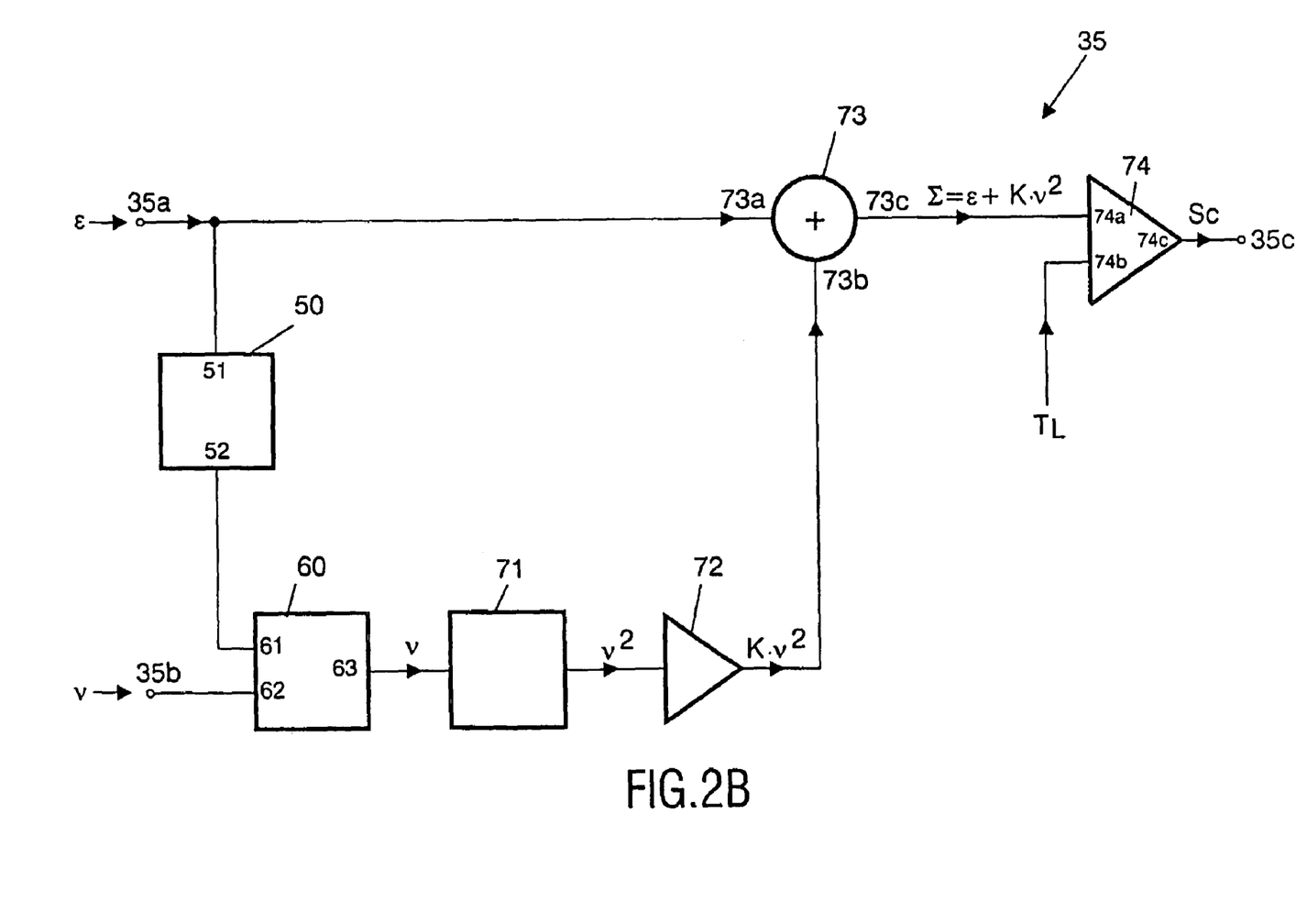
FIG. 2B is a functional block diagram schematically illustrating a processor unit.

FIG. 2B is a functional block diagram schematically illustrating an embodiment of the processor unit 35, having two inputs 35a, 35b and an output 35c. The first input 35a is for receiving an input error signal $\epsilon$. The processor unit 35 comprises an adder 73 having an input 73a receiving the error signal $\epsilon$ from the first input 35a.

A signal representing the changing rate of the error signal $\epsilon$, i.e. representing the velocity of the object concerned, will hereinafter be indicated by v. Such signal may be provided by an external detector, coupled with the object in question to detect its speed. In principle, any suitable velocity detector may be used, so it is not necessary here to explain the design and functioning of a velocity detector. Suffice it to say that such velocity detector (not shown) is capable of providing a velocity signal v at a second input 35b of the processor unit 35.

However, it is also possible that the processor unit 35 itself is capable of deriving a velocity signal v from the input error signal $\epsilon$ by calculating the velocity v as the first time-derivative of the error signal $\epsilon$, according to the following formula:

$$v = d\epsilon/dt$$

In the functional block diagram of FIG. 2B, the processor unit 35 is shown as having a calculating unit 50 having an input 51 receiving the error signal $\epsilon$, this calculating unit 50 being designed to provide at its output 52 the first time-derivative (d/dt) of its input signal. Since such calculating units are known per se, and a prior art calculating unit may be used here, it is not necessary here to discuss the design and operation of such calculating unit in great detail. However, it is noted that the calculating unit 50 may be implemented as a hardware device, but may also be implemented in software.

The processor unit 35 may be specifically designed for receiving an input error signal $\epsilon$ as well as an input velocity signal v. In that case, the processor unit 35 will have two inputs 35a and 35b, and the calculating unit 50 may be omitted. On the other hand, it is also possible that the controller 30 is specifically designed to only receive an input error signal $\epsilon$, in which case the second input 32 may be omitted. In the preferred embodiment shown in FIG. 2B, the controller 30 is usable with or without an external velocity signal v, as desired. To this end, the processor unit 35 comprises a switch 60 having a first input 61 coupled to the output 52 of the calculating unit 50, and having a second input 62 coupled to the second input 35b of the processor unit 35. The switch 60 has an output 63, and is capable of connecting its output 63 with either its first input 61 or its second input 62. In the case of operation in conjunction with a velocity detector, the switch 60 will be set in a position connecting the output 63 with its second input 62. In the case of operation without a velocity detector, the switch 60 will be set in a position connecting its output 63 to its first input 61. Thus, at the output 63 of the switch 60, the velocity signal v is always present.

It is noted that, in stead of receiving a velocity signal v, or calculating the velocity signal v by calculating the first time derivative of the error signal $\epsilon$, it is also possible to use a state estimator, i.e. a filter estimating the value of a parameter (such as speed) from an estimate which is relatively inaccurate due to noise. Such estimators are known in the art, therefore it is not necessary here to describe their design and functioning in great detail here. By way of suitable example, a Kalman state estimator is mentioned here.

The adder 73 has a second input 73b coupled to receive a signal derived from said velocity signal v. FIG. 2B illustrates that the velocity signal v is processed before being applied to the second input 73b of the adder 73. In the preferred embodiment illustrated in FIG. 2B, this pre-processing comprises the steps of squaring the velocity signal v by a square calculator 71, and multiplying the squared velocity signal $v^2$ with a constant value K by a multiplier 72, so that the adder 73 receives $K \cdot v^2$.

In the adder 73, this input signal $K \cdot v^2$ is added to the error signal $\epsilon$ received at the first input 73a, to yield a summation $\Sigma$, which is provided to a first input 74a of a comparator 74. A second input 74b of the comparator 74 receives a signal indicating a transition level $T_L$. An output 74c of the comparator 74 is coupled to the output 35c of the processor unit 35. The comparator 74 compares the summation $\Sigma$ received at its first input 74a l with the transition level $T_L$. If the summation $\Sigma$ is below this transition level $T_L$, the comparator 74 provides an output signal Sc having a first value. Otherwise, if the summation $\Sigma$ is above said transition level, the output signal Sc has a second value.

The switch 40 is responsive to said output signal Sc by selecting its first operative state if the control signal Sc has its first value, and by selecting its second operative state if the control signal Sc has its second value.

Alternatively, it is possible that the processor unit 35 provides the summation $\Sigma$ as output signal Sc, and that the comparator 74 is incorporated in the switch 40.

The comparator 74 may have a characteristic with hysteresis, i.e. a higher transition level $T_{L1}$ for rising summation $\Sigma$ and a lower transition level $T_{L2}$ for falling summation $\Sigma$, as will be clear to a person skilled in the art.

Since a square calculator, a multiplier, an adder, and a comparator are commonly known components, and such prior art components may be used in the controller 30 of the present invention, it is not necessary here to discuss the design and operation of such components in great detail. However, it is noted that such components may be implemented in hardware, but may also be implemented in software.

Figure 3:
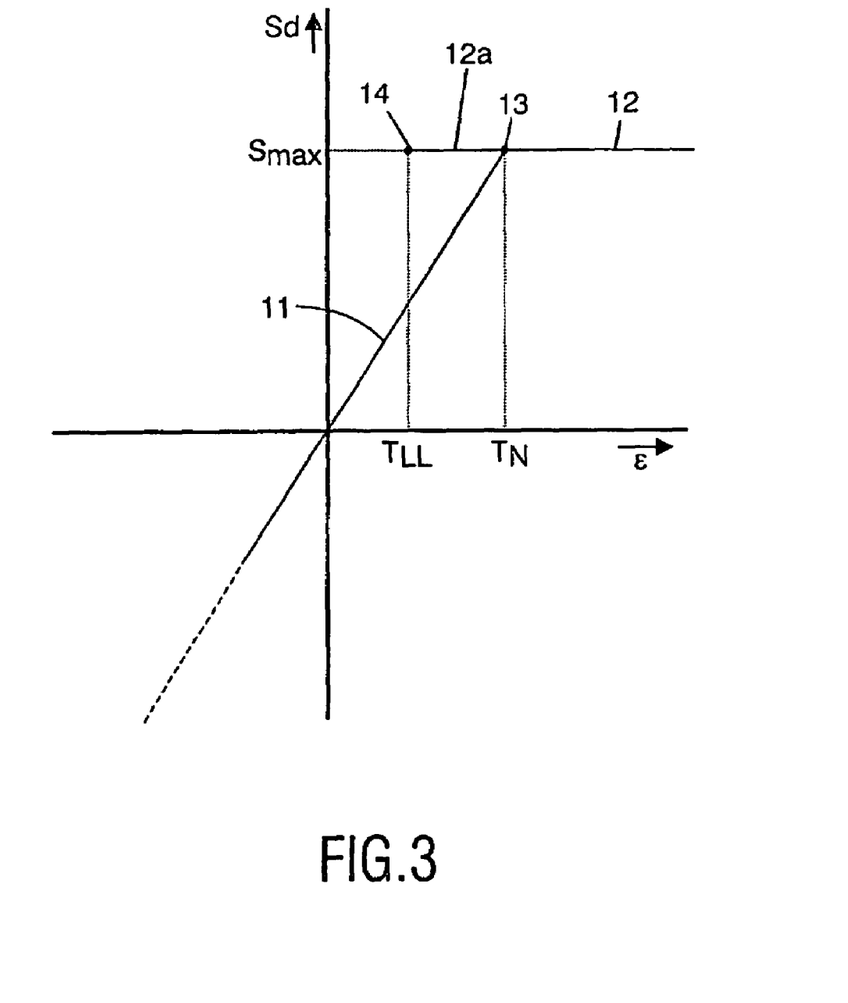
FIG. 3 is a graph illustrating the characteristic of an embodiment of the controller of FIG. 2A.

In a relatively simple embodiment, the first controller unit 33 is a proportional controller, having a characteristic as illustrated in FIG. 1A, while the second controller unit 34 outputs a constant output signal S2 irrespective of the error signal $\epsilon$. The resulting characteristic of the controller device 30 is illustrated in FIG. 3, wherein the horizontal axis represents the error signal $\epsilon$ and wherein the vertical axis represents the controller output signal Sd. Since the characteristic preferably, although not necessarily, is symmetrical with respect to the origin point (0,0), FIG. 3 only shows one quadrant of the characteristic. The inventive controller has two operative modes, and is switchable between these two operative modes on the basis of at least two parameters. In its first operative mode, when switch 40 is in its first operative state and the controller's behavior is determined by the first controller unit 33, the controller has a linear characteristic, illustrated by a straight line 11 in FIG. 3, this straight line 11 crossing the origin. In this first operative mode, the output drive signal Sd of the controller is linearly proportional to the error signal $\epsilon$.

In its second operative mode, when switch 40 is in its second operative state and the controller's behavior is determined by the second controller unit 34, the output drive signal Sd is substantially constant, irrespective of the exact magnitude of the input error signal. This second mode, which will-also be indicated as constant mode, is illustrated by a second straight line 12 in FIG. 3, this second straight line 12 being a horizontal line. The first line 11 and the second line 12 meet each other in a transition point 13; the error signal level corresponding to this transition point 13 will be referred to as normal transition threshold level $T_N$.

In FIG. 3, the level of the output drive signal in the constant mode is indicated as $S_{max}$, indicating the maximum output signal that this controller may provide. It is noted that this maximum level may be the upper limit of the capabilities of the second controller unit 34, i.e. the controller is simply not capable of generating any output signal having a magnitude larger than $S_{max}$. It may also be that this upper limit corresponds to a maximum level of a power amplifier driving the actuator. However, it may also be that this level $S_{max}$ is defined by a software or hardware limiter, and that the level of $S_{max}$ may be set by setting such limiter, either on manufacture of the controller or as a user setting.

Under normal circumstances, the controller device 30 behaves as an ordinary linear controller, operating in the first or linear operative mode. Under such normal circumstances, the input error signal $\epsilon$ is smaller than the normal transition level $T_N$, and the controller generates its output drive signal Sd in accordance with the characteristic of the first straight line 11. This will be expressed as the controller device 30 moving along the first line 11.

If the input error signal $\epsilon$ is slowly increased, the controller device 30 will travel the first straight line 11 until the transition point 13 is reached, upon which the controller device 30 will make a transition to the second operative mode and travel the second straight line 12, i.e. it will keep its output drive signal constant. It is noted that, normally, in a prior art controller, such transition will also be made, i.e. if the input error signal $\epsilon$ is so large that the controller reaches saturation.

The prior art controller discussed above with reference to FIG. 1B also has two operative modes, each mode being characterized by a line portion in the characteristic Sd/FE diagram. These two operative modes according to the prior art are defined exclusively by the input signal FE: below a certain threshold level, the controller always is in its first operative mode, and above this threshold level, the controller always is in its second operative mode. In contrast, according to an important aspect of the important invention, the two operative modes have a certain overlap, illustrated by a line portion 12a of the second straight line 12, this line portion 12a extending beyond the transition point 13 to lower values for the input error signal. This line portion 12a may have an end point indicated as lower limit 14; the corresponding error signal level is indicated as lower limit threshold level $T_{LL}$. This lower limit threshold level $T_{LL}$ may be larger than zero, but preferably line portion 12a extends all the way down to the vertical axis, i.e. the end point 14 may correspond to an input error signal zero.

Thus, in the input error range from $T_{LL}$ to $T_N$, the controller device 30 has two characteristics, and is switchable between these two characteristics, or, in other words, for a certain input error signal in the range from $T_{LL}$ to $T_N$, the controller may be in any of its two operative modes, even for the same input error signal. Switching between these two operative modes is done on the basis of the summation signal $\Sigma$, which contains a substantial contribution of a second signal (v), indicative of the rate at which the error signal $\epsilon$ changes, as will be discussed below.

If the error signal $\epsilon$ is above the normal transition threshold level $T_N$, the output signal Sd will always be generated in accordance with the second operative mode, i.e. the constant mode (12).

If the input error signal $\epsilon$ is below the normal transition threshold level $T_N$ but above the lower limit threshold level $T_{LL}$, while the changing rate is relatively small, then the output signal S will be generated in accordance with the first operative mode (11). Otherwise, if the input error signal $\epsilon$ is below the normal transition threshold level $T_N$ but above the lower limit threshold level $T_{LL}$, while the changing rate is relatively large, then the output signal S will be generated in accordance with the second mode, i.e. the constant mode (12a).

Finally, if the input error signal $\epsilon$ is below the lower limit threshold level $T_{LL}$, the output signal S will always be generated in accordance with the first operative mode, i.e. the linear mode (11).

In the case of an optical drive, the error signal $\epsilon$ is in fact a measure for the position of an object (objective lens, or optical head); in that case, the changing rate of the error signal is in fact a measure for the actual velocity of this object with respect to a target object to be followed by said object, e.g. a track of the optical disc drive. Large velocities will for instance occur in extreme circumstances like mechanical shock. For such extreme circumstances, it is desirable that the controller device 30 operates in the second operative mode, which gives the highest possible repressive force.

The transition level $T_L$ and the multiplying constant K may be fixed values, defined on manufacture of the processing unit 35. It is, however, also possible that the multiplier 72 is settable so that the multiplying constant may be varied by a user. The same applies to the comparator 74 in respect of the transition level $T_L$. Preferably, said multiplying constant K and said transition level $T_L$ are chosen in conjunction with operative characteristics of the actuator for which the controller is intended. This will be explained as follows.

As mentioned before, the actuator receiving the drive output signal from the controller device 30 will exert a force on the object concerned (objective lens, optical head), such force resulting in an acceleration of this object. In principle, the force exerted will be higher if the drive signal Sd is larger, and hence the acceleration caused by this force is larger. However, the acceleration can not be infinitely high. In practice, the acceleration is limited by a maximum acceleration level $a_{max}$.

Assume that, at a certain time $\tau$, the error signal $\epsilon$ has a certain value $\epsilon(\tau)$, and that the velocity signal v has a certain value $v(\tau)$. These values correspond with a certain position of the object concerned (objective lens, optical head) deviating from a target position, and a velocity of this object, respectively. Assume further that the actuator exerts a constant force F on this object, having a direction urging the object toward its target position with a constant acceleration a, i.e. having a direction reducing $\epsilon$. Further, assume that the velocity v has a direction away from the target position, such that in the immediate future the acceleration a will reduce the velocity v but the error signal $\epsilon$ will increase. It can easily be shown that, if the acceleration a is kept constant, the object will achieve a maximum deviation from its target position, corresponding to a maximum error signal $\epsilon_{max}$, in accordance with the following formula $$\epsilon_{max} = \epsilon(\tau) + v(\tau)^2/2a.$$

Obviously, the larger the velocity $v(\tau)$ is, the larger will be the maximum deviation $\epsilon_{max}$.

If the acceleration a is increased, this maximum deviation $\epsilon_{max}$ will decrease. However, as stated above, the maximum acceleration in this system has an upper limit $a_{max}$. Therefore, the maximum deviation $\epsilon_{max}$ can not be made smaller than a value $\epsilon_{max,min}$ according to the following formula $$\epsilon_{max,min} = \epsilon(\tau) + v(\tau)^2/(2a_{max})$$

In the controller device 30, the constant K is selected to be at least approximately equal to $1/(2a_{max})$. Then, the summation $\Sigma$ is equal to the minimally achievable value $\epsilon_{max,min}$ of the maximum deviation $\epsilon_{max}$.

In the controller device 30, the threshold level $T_L$ with which the summation $\Sigma$ is compared, now corresponds to a limit value of the acceptable deviation $\epsilon$. As long as the summation $\Sigma$ stays below this acceptable limit $T_L$, it is predicted that the maximum deviation $\epsilon_{max}$ will be within acceptable limits, and the controller device 30 is allowed to operate in its linear mode (11). If, on the other hand, the summation $\Sigma$ exceeds the acceptability level $T_L$, it is predicted that the maximum deviation $\epsilon_{max}$ will appear to be a large value, larger than acceptable, due to perhaps some unforseen external circumstances, and the controller device 30 decides to take emergency action by switching its operation to the second operative state in which the corrective action of the actuator is as large as possible.

Figure 4A:
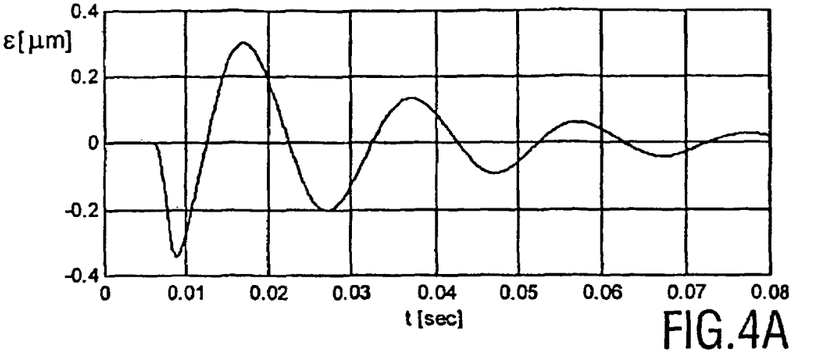
FIGS. 4A–4C are graphs illustrating simulations.
Figure 4B:
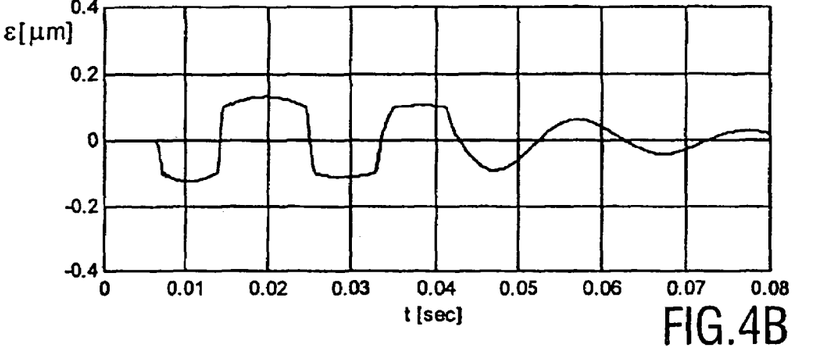
Figure 4C:
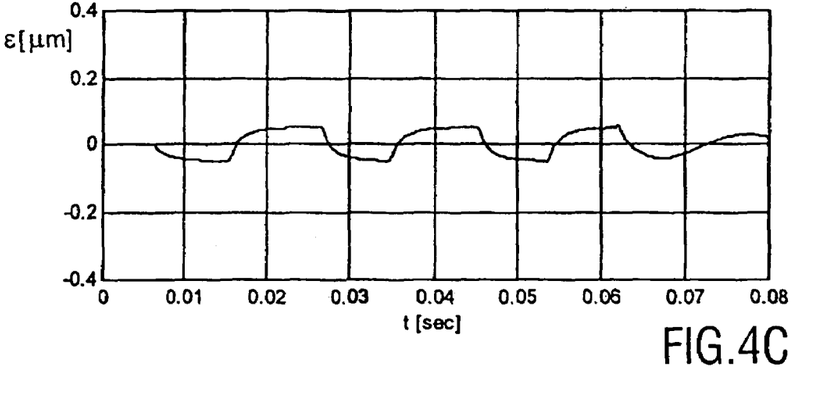

The performance of the controller proposed by the present invention was investigated by running simulations. FIGS. 4A–4C illustrate the result of simulation where an objective lens was assumed to oscillate, due to a mechanical shock, with a decreasing amplitude about its target position, the deviation of the objective lens from this target position being expressed as error $\epsilon$ (μm). In the simulation illustrated in FIG. 4A, the controller device 30 was assumed to operate as a normal PID-controller, its gain having a linear characteristic as illustrated in FIG. 1A. In other words, with reference to FIG. 2A, the first controller unit 33 has a PID characteristic, and the switch 40 is constantly operated in its first operative state.

In the simulation illustrated in FIG. 4B, the controller was assumed to have a switching gain characteristic as illustrated in FIG. 1B, the linear characteristic portion (2) corresponding to the linear characteristic (1) of the PID-controller of FIG. 4A. The transition point P corresponded to an error $\epsilon$ of 0.1 μm. The first gain $G1=\tan(\alpha)$ of the linear characteristic portion (2) had a value $9\cdot10^4$; the second gain $G2=\tan(\beta)$ of the second characteristic portion (3) had a value $59\cdot10^4$. In other words, with reference to FIG. 2A, the first controller unit 33 has a linear PID characteristic with a first gain G1=9·10⁴, and the second controller unit 34 has a PID characteristic with a second gain G2=59·10⁴. In the processor unit 35, the constant K is zero, and the transition level $T_L$ equals 0.1 µm.

FIG. 4C illustrates the performance of a controller operated in accordance with the present invention. Again, the first controller unit 33 has a linear PID characteristic with a first gain G1=9·10⁴, and the second controller unit 34 outputs a constant output signal, as discussed earlier with reference to the horizontal characteristic 12a of FIG. 3. The transition level $T_L$ of the comparator 74 equals 0.1 µm for rising signals, and 0.09 µm for falling signals (hysteresis). The value of K was set to be equal to $1/(2a_{max})$, $a_{max}$ being equal to 100 m/s².

By comparing FIG. 4C with FIG. 4B it clearly follows that the maximum deviation occurring when using the controller proposed by the present invention is much smaller than the maximum deviation when using the controller illustrated in FIG. 4B.

Figure 5A:
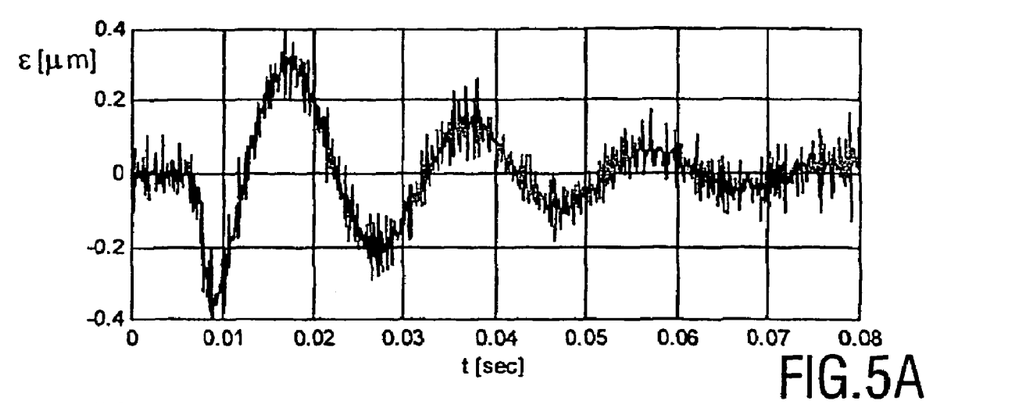
FIGS. 5A–5C are graphs illustrating simulations.
Figure 5B:
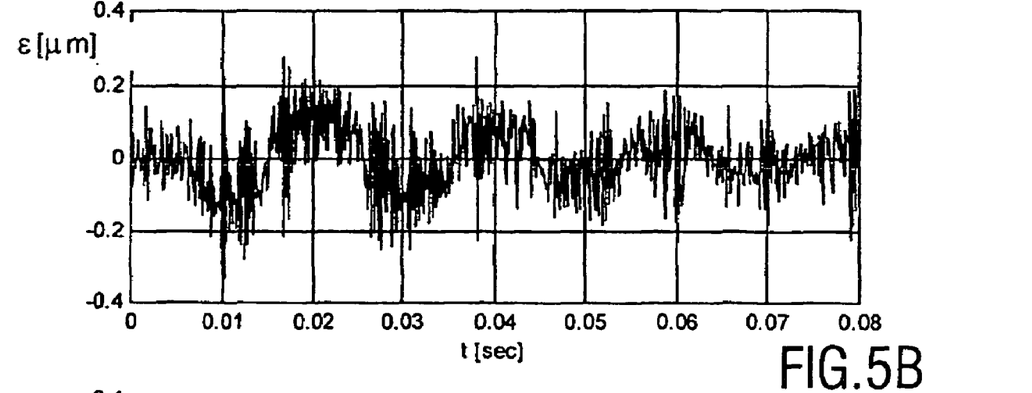
Figure 5C:
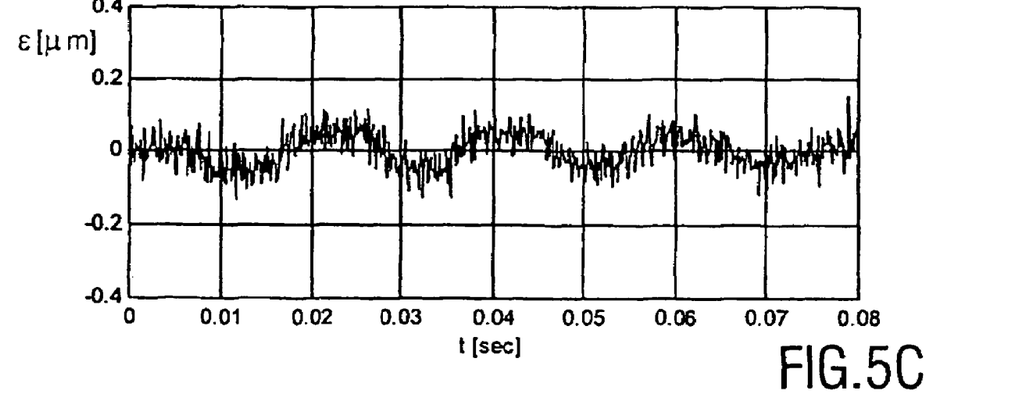

FIGS. 5A–5C illustrate the results of simulation identical to the simulations of FIGS. 4A–4C, with the additional feature that the system was now assumed to contain noise. It can clearly be seen in FIG. 5B that the switching gain controller having a characteristic as illustrated in FIG. 1B, in the case of noise, may suffer from very strong oscillation peaks, such as for instance shown at 10 ms, at 38 ms and at 79 ms. It can clearly be seen from FIG. 5C that the oscillator proposed by the present invention is free from such strong oscillation peaks.

It should be clear to a person skilled in the art that the present invention is not limited to the exemplary embodiments discussed above, but that various variations and modifications are possible within the protective scope of the invention as defined in the appending claims.

For instance, the characteristic of the controller is described as a combination of two straight lines 11 and 12, intersecting each other. However, the fact that the two lines are straight is not essential; those lines may be curved. Relevant is that the controller is capable of operating in at least two possible operative modes, each mode having a corresponding characteristic, and that at least two of said characteristics have an overlap in a range of error signal values $[T_{LL}-T_N]$. Further it is relevant that the controller is capable of switching from one mode to another, based on the value of at least one other parameter, which preferably is the time-derivative of the error signal, so that the controller can be in any of its modes even when the error ϵ is the same.

In a preferred embodiment, one of the characteristics is a maximum characteristic, i.e. a horizontal line (12), while another one of the characteristics is a lower line (curved or straight) intersecting the origin and intersecting the maximum characteristic (12). In a further elaboration, the controller may have a third characteristic or intermediate characteristic between the above-mentioned lower and maximum characteristics. If the velocity v is relatively low, the controller follows the lower characteristic; if the velocity v is relatively high, the controller follows the maximum characteristic; if the velocity v is within an intermediate range, the controller follows the intermediate characteristic.

Further, in the above-described examples, a criterion Σ is defined on the basis of two parameters ϵ and v. It is, however, also possible to define a criterion on the basis of three or more parameters. For instance, as a third parameter, the second derivative $d^2\epsilon/d\epsilon^2$ may be used. In any case, if the number of parameters equals n, together they define the coordinate system of an n-dimensional space, and the criterion divides this n-dimensional space in two sections. The controller device is operated in one mode if its state, as projected on said coordinate system, corresponds to a point in one section of said n-dimensional space, whereas the controller device is operated in another mode if its state corresponds to a point in another section of said n-dimensional space. In order to provide a behavior with hysteresis, two parallel criterions $\Sigma^+$ and $\Sigma^-$ may be defined, differing only slightly, so that, when the controller's state travels from said one section to said other section of said n-dimensional space, it will cross the two parallel criterion boundaries consecutively, and the controller will change its mode only on the second boundary crossing.

The invention claimed is:

1. Controller having a switchable performance characteristic, comprising:
    a first input for receiving an error signal;
    an output for generating an actuator drive signal;
    the controller being capable of operating in a first operative mode with a first performance characteristic in a first range of error signal values;
    the controller being capable of operating in a second operative mode with a second performance characteristic in a second range of error signal values;
    wherein said first range and said second range have an overlap $[T_{LL}-T_N]$;
    the controller being switchable from first operative mode to second operative mode and vice versa for an error signal value in the said overlap.

2. Controller according to claim 1, wherein said second range of error signal values has a lower limit threshold which preferably is approximately zero.

3. Controller according to claim 1, wherein said first range of error signal values has an upper limit threshold.

4. Controller according to claim 3, wherein said upper limit threshold corresponds to a transition point where the first characteristic intersects the second characteristic.

5. Controller according to claim 1, wherein the controller is designed to select either its first operative mode or its second operative mode on the basis of a combination of an input error signal and a velocity signal.

6. Controller according to claim 5, wherein the controller comprises a second input for receiving an input velocity signal.

7. Controller according to claim 5, wherein the controller comprises a calculating unit having an input coupled to the error signal input of the controller, and being designed for calculating a first time-derivative v=dϵ/dt and for providing at an output an output signal representing said first time-derivative v.

8. Controller according to claim 7, wherein the controller comprises a switch having a first input connected to the output of the calculating device, having a second input connected to the second input of the controller, and having an output optionally connectable to either the first input or the second input.

9. Controller according to claim 5, wherein the controller is designed to compare a predetermined combination of an input error signal and said velocity signal with a predetermined threshold level.

10. Controller according to claim 9, wherein said predetermined combination of error signal and velocity signal is a summation Σ calculated in accordance with the formula $$\Sigma = \epsilon + K \cdot v^2.$$

11. Controller according to claim 10, wherein $K=1/(2a_{max})$, $a_{max}$ being a maximum attainable acceleration value.

12. Controller according to claim 9, wherein said predetermined threshold level corresponds with a predetermined error limit value.

13. Controller according to claim 5, further comprising:
a first controller unit having an input connected to said first input and having an output providing an output signal $S1(\epsilon)$, the first controller unit having a first characteristic;
a second controller unit having an input connected to said first input and having an output providing an output signal $S2(\epsilon)$, the second controller unit having a second characteristic;
a controllable switch unit having a first input coupled to the output of the first controller unit, a second input coupled to the output of the second controller unit, a control input, and an output coupled to the controller output;
wherein the controllable switch unit can be operated in a first operative state wherein its output is coupled to its first input, and in a second operative state wherein its output is coupled to its second input;
the controllable switch unit being responsive to a control signal received at its control input to selects said first operative state or said second operative state.

14. Controller according to claim 13, wherein the first controller unit is implemented as a proportional controller, or a PI-controller, or a PD-controller, or a PID-controller; and wherein the second controller unit is implemented as a proportional controller, or a PI-controller, or a PD-controller, or a PID-controller.

15. Controller according to claim 13, further comprising a processor unit having a first input coupled to said first controller input, and having an output coupled to said control input of said controllable switch unit.

16. Controller according to claim 15, wherein said processor unit is capable of generating its output signal having a first predetermined value if $\Sigma>T_L$ applies, and wherein said processor unit is capable of generating its output signal having a second predetermined value if $\Sigma<T_L$ applies, in which:

$T_L$ is a predetermined threshold level;
$\Sigma=\epsilon+K \cdot v^2$, in which:
$\epsilon$ is a signal received at the first controller input;
$v$ represents the first time-derivative $d\epsilon/dt$;
$K=1/(2a_{max})$, in which:
$a_{max}$ is a maximum attainable acceleration value.

17. Controller according to claim 16, wherein said processor unit comprises a calculating unit having an input coupled to the first input of the processor unit, and being designed for calculating a first time-derivative $v=d\epsilon/dt$ and for providing at an output an output signal representing said first time-derivative $v$.

18. Controller according to claim 15, as far as depending on claim 6, wherein said processor unit has a second input coupled to said second controller input, for receiving a signal representing said first time-derivative.

19. Controller according to claim 18, wherein said processor unit comprises a switch having a first input connected to the output of the calculating device, having a second input connected to the second input of said processor unit, and having an output optionally connectable to either the first input or the second input.

20. Controller according to claim 15, wherein said processor unit comprises a square calculator receiving a signal $v$ representing said first time-derivative and calculating $v^2$, and a multiplier multiplying the output signal of said square calculator by a predetermined value.

21. Controller according to claim 20, wherein said processor unit comprises an adder having a first input coupled to said first input of said processor unit, and having a second input coupled to an output of said multiplier.

22. Controller according to claim 21, wherein said processor unit comprises a comparator having a first input coupled to an output of said adder, having a second input receiving said predetermined threshold level, and having an output coupled to the output of said processor unit.

23. Servo system for controlling the position of a movable object, comprising:
a controller according to claim 1;
a first detector capable of generating an error signal indicating a deviation between actual object position and target object position;
an actuator receiving a drive signal from said controller and operatively associated with said object to exert an object moving force under control of said control signal S.

24. Servo system according to claim 23, further comprising a second detector capable of generating a signal indicating a velocity of said object.

25. Optical disc drive comprising at least one movable optical component and a servo system according to claim 23 for controlling the actual position of said optical component.

26. Optical disc drive according to claim 25, wherein said optical component is an objective lens.

27. Optical disc drive according to claim 25, wherein said optical component is an optical head.

* * * * *